United States Patent Office 2,990,439
Patented June 27, 1961

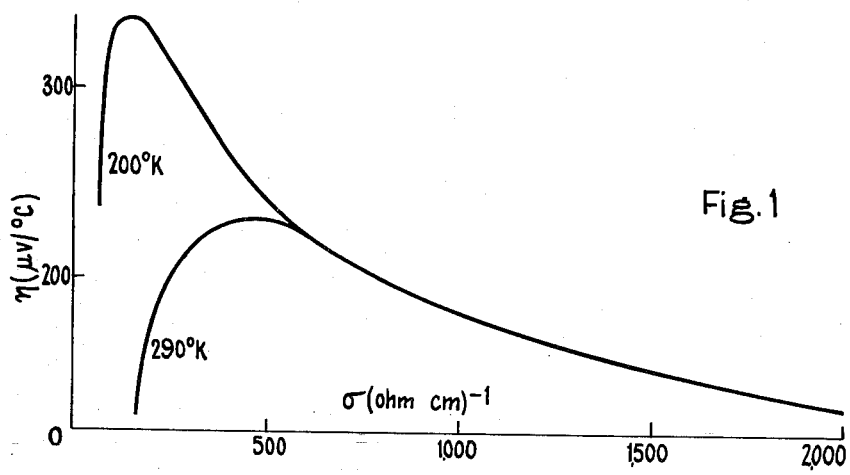
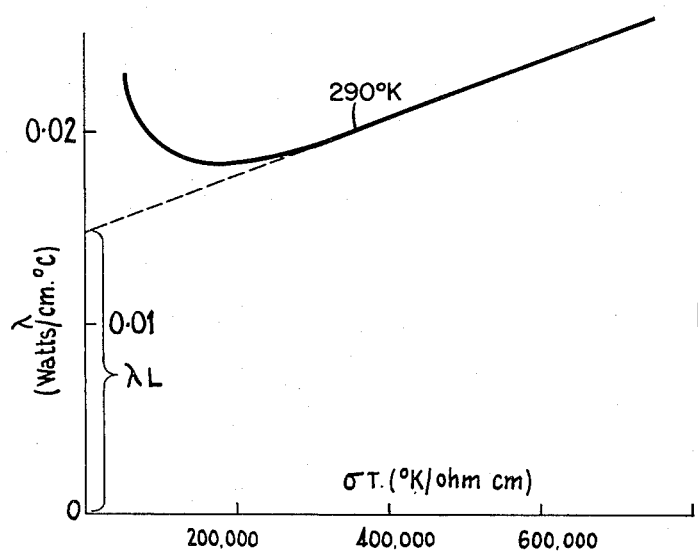
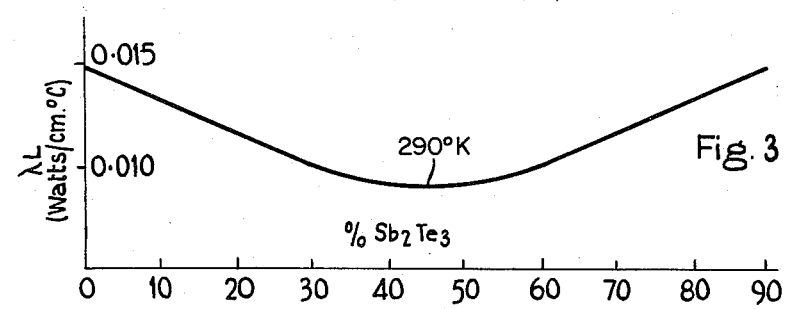
Fig. 1
Fig. 2
Fig. 3
INVENTORS
HIROSHI JULIAN GOLDSMID
ANTHONY ROBERT SHEARD
BY Kirschstein, Kirschstein & Ottinger
ATTORNEYS

2,990,439
THERMOCOUPLES
Hiroshi Julian Goldsmid, South Ruislip, and Anthony Robert Sheard, Northwood, England, assignors to The General Electric Company Limited, London, England
Filed Dec. 16, 1957, Ser. No. 702,936
Claims priority, application Great Britain Dec. 18, 1956
8 Claims. (Cl. 136—5)

This invention relates to thermocouples.

It is an object of the invention to provide improved thermocouples utilising semiconductors.

It is known that a measure of the efficiency of a thermocouple when used in a device such as a thermo-electric refrigerator or generator is given by a figure of merit $\theta$ defined as $$\frac{|\eta_1 - \eta_2|\sqrt{T}}{\sqrt{\lambda_1/\sigma_1} + \sqrt{\lambda_2/\sigma_2}}$$

where the suffixes 1 and 2 refer respectively to the two elements of the thermocouple, T is the arithmetic mean of the absolute temperatures of the hot and cold junctions of the thermocouple, and $\eta$, $\lambda$ and $\sigma$ are respectively the thermoelectric power, thermal conductivity and electrical conductivity of an element measured at the temperature T in the direction of the length of the element between the hot and cold junctions. It is obviously desirable that $\eta_1$ and $\eta_2$ should be of opposite sign; this can be arranged by making the elements of the thermocouple of semiconductors respectively of P-type and N-type conductivity.

In considering the suitability of a particular semiconductor for use in a thermocouple it is convenient to define for the material an individual figure of merit $\phi$ equal to $|\eta|\sqrt{T\sigma/\lambda}$; it may be noted that for a thermocouple having elements respectively composed of P-type and N-type semiconductors which have respective individual figures of merit $\phi_P$ and $\phi_N$ when the relevant properties of the semiconductors are measured in the respective directions of the lengths of the elements at a temperature T, the overall figure of merit $\theta$ at a mean operating temperature T will lie between $\phi_P$ and $\phi_N$, being equal to $\phi_P$ and $\phi_N$ in the limiting case in which these quantities are equal. It is further convenient to regard the thermal conductivity $\lambda$ as the sum of two components, $\lambda_L$ and $\lambda_E$, the former representing the thermal conductivity due to the atoms of the crystal lattice of the semiconductor and the latter representing the thermal conductivity due to conduction electrons and/or holes.

For a particular semiconductor at a fixed temperature, the quantities $\eta$, $\sigma$ and $\lambda_E$ will in general vary appreciably according to the significant impurity content of the semiconductor, and all the quantities $\eta$, $\sigma$, $\lambda_L$ and $\lambda_E$ may display some degree of anisotropy. In connection with the former effect it is convenient, as is common in the semiconductor art, to refer to the significant impurity content in terms of the electrical conductivity of the semiconductor; as is well known, the electrical conductivity of a semiconductor of a given conductivity type at a given temperature increases with increase of the net significant impurity concentration (that is to say the difference between the donor impurity concentration and the acceptor impurity concentration). The effect of the significant impurity content on the value of $\phi$ for a given semiconductor may be described by reference to the results of measurements of the quantities $\eta$, $\sigma$ and $\lambda$ on a series of samples of the semiconductor all of the same conductivity type but having different values of the electrical conductivity $\sigma$, the measurements all being carried out at a fixed temperature; where the semiconductor is anisotropic in respect of any of the relevant properties, each sample should consist of a single crystal or a plurality of aligned crystals and the measurements should be carried out in a direction having a specified orientation relative to the crystal axes. For such a series of samples it will in general be found that $\phi$ is a single valued function of $\sigma$ having a single maximum value; the precise nature of the variation of $\phi$ with $\sigma$ will of course in general differ from one semiconductor to another, and will frequently differ between the two conductivity types of the same semiconductor. Apart from the variations discussed above, the value of $\phi$ for a given sample of a semiconductor will in general vary with the temperature T, both on account of the direct variation of T and because of the variation of one or more of the quantities $\eta$, $\sigma$ and $\lambda$ with T.

In the light of the preceding discussion, it will be appreciated that in comparing two semiconductors in respect of the figure of merit $\phi$, it is desirable to define standard bases of comparison in respect of the significant impurity content of the semiconductors, the orientation of the measurements on which the values of $\phi$ are based, and the temperature at which the measurements are carried out.

Prior to the present invention the best results in the application of semiconductors in thermocouples appear to have been achieved with thermocouples incorporating elements respectively of P-type and N-type bismuth telluride ($Bi_2Te_3$). The present invention is based upon an investigation of the effects, particularly in respect of the properties upon which the figure of merit $\phi$ depends, of the substitution of antimony for part of the bismuth, and/or the substitution of selenium and/or sulphur for part of the tellurium, in bismuth telluride. The materials thereby produced are semiconductors having a crystal structure similar to that of bismuth telluride, and may be regarded as substitutional solid solutions of bismuth telluride and one or more of the compounds antimony telluride ($Sb_2Te_3$), bismuth selenide ($Bi_2Se_3$) and bismuth sulphide ($Bi_2S_3$), or may be regarded as compounds having formulae such as $Bi_xSb_{2-x}Te_3$ and $Bi_2Te_ySe_{3-y}$.

According to the invention, at least one element of a thermocouple consists essentially of a semiconductor having a constitutional formula $Bi_mSb_nTe_pSe_qS_r$ (where $n$ has a value in the range 0–1.8, $q$ has a value in the range 0–0.4 and $r$ has a value in the range 0–0.24, subject to the conditions that $m+n=2$, $p+q+r=3$, $3n+2q+2r$ is not less than 0.03 and $3q+5r$ is not greater than 1.2), the semiconductor having a crystal structure similar to that of bismuth telluride and each crystal of the semiconductor in the element being orientated with its principal crystal axis substantially perpendicular to the direction of the length of the element between the junctions of the thermocouple.

Preferably, the constitutional formula of the semiconductor is such that $n$ has a value in the range 0.35–1.6 and $3q+5r$ has a value in the range 0–0.9, and the semiconductor has an electrical conductivity, measured in the direction of the length of the element at a temperature of 290° K., lying in the range 500–2000 (ohm centimetres)$^{-1}$.

According to one aspect of the invention, a method of preparing material for thermocouple elements comprises the steps of: melting together in vacuo bismuth, tellurium, and at least one of the elements antimony, selenium and sulphur, in proportions corresponding to a constitutional formula $Bi_mSb_nTe_pSe_qS_r$ such that $n$ has a value in the range 0–1.8, $q$ has a value in the range 0–0.4 and $r$ has a value in the range 0–0.24, subject to the conditions that $m+n=2$, $p+q+r=3$, $3n+2q+2r$ is not less than 0.03, and $3q+5r$ is not greater than 1.2; producing from the molten material an elongated solid ingot; and subjecting the ingot to the process known as "zone melting."

The invention will be further described with reference to the accompanying drawings, in which:

FIGURE 1 shows a curve illustrating certain properties of P-type bismuth telluride;

FIGURE 2 shows a further curve illustrating certain other properties of P-type bismuth telluride;

FIGURE 3 shows a curve illustrating certain properties of semiconductors which may be used in thermocouples according to the present invention;

Figure 4:
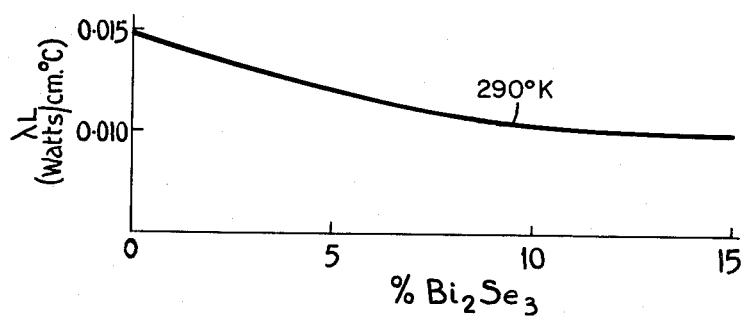
FIGURE 4 shows a further curve illustrating certain properties of other semiconductors which may be used in thermocouples according to the present invention.

Before discussing the properties of the semiconductors which are used in thermocouples according to the present invention, it is convenient, for the purpose of comparison, to discuss certain properties of bismuth telluride.

Firstly, it may be remarked that bismuth telluride displays anisotropy in respect of certain of its physical properties. The compound crystallises in the trigonal system, and a crystal of bismuth telluride can be cleaved easily in planes perpendicular to the principal crystal axis. It has been found for both P-type and N-type bismuth telluride that both the electrical conductivity $\sigma$ and the thermal conductivity $\lambda$ vary considerably in accordance with the inclination to the principal crystal axis of the direction in which they are measured; for P-type bismuth telluride the thermoelectric power $\eta$ is substantially isotropic, while for N-type bismuth telluride it varies slightly in accordance with the inclination to the principal crystal axis of the direction in which it is measured. The overall result of the anisotropy is that for both conductivity types the value of the figure of merit $\phi$ is at a maximum for directions perpendicular to the principal crystal axis, that is to say parallel to the cleavage planes; further discussion of the properties of bismuth telluride will therefore be restricted to the properties measured in such a direction. In view of the anisotropy of the figure of merit $\phi$, it will be appreciated that for maximum efficiency a thermocouple element of bismuth telluride should consist of one or more crystals for each of which the principal crystal axis is disposed substantially perpendicular to the direction of the length of the element between the hot and cold junctions.

Reference will now be made to FIGURES 1 and 2 of the accompanying drawings, which show curves illustrating some of the properties of P-type bismuth telluride; these curves were derived by making measurements on a series of samples of bismuth telluride in the manner discussed above. In FIGURE 1 the thermoelectric power $\eta$, expressed in microvolts/° C., is plotted against the electrical conductivity $\sigma$, expressed in (ohm centimetres)$^{-1}$, for temperatures of 200° K. and 290° K. It will be seen that at a given temperature, as the conductivity $\sigma$ increases the thermoelectric power $\eta$ first increases, passes through a maximum, and then decreases. The position and height of the maximum differ for differing temperatures, but the curves for different temperatures coincide for higher values of the conductivity $\sigma$. In FIGURE 2 the thermal conductivity $\lambda$, expressed in watts/centimetre ° C., is plotted against the product of the electrical conductivity $\sigma$ and the absolute temperature T, expressed in ° K./ohm centimetre, for a temperature of 290° K. It will be seen that as the electrical conductivity $\sigma$ increases the thermal conductivity $\lambda$ first decreases, passes through a minimum, and then increases, the portion of the curve corresponding to higher values of the electrical conductivity $\sigma$ being linear and having a slope whose value, as would be expected from theoretical considerations, is equal to $2(K/E)^2$, where K is Boltzmann's constant and E is the electronic charge; the intercept of the linear portion of the curve on the $\lambda$ axis gives the value of the lattice component $\lambda_L$ of the thermal conductivity. For any other temperature, the corresponding curve has a similar form to that shown in FIGURE 2 (including a linear portion having the same slope) but the position and height of the minimum and the value of $\lambda_L$ are different.

From data provided by curves such as are shown in FIGURES 1 and 2, it is possible to plot a curve of the figure of merit $\phi$ against the electrical conductivity $\sigma$ for P-type bismuth telluride at a given temperature. In particular, if such a curve is plotted for a temperature of 290° K., it is found that the maximum value of $\phi$ is approximately 0.73, when the thermoelectric power $\eta$ is expressed in volts/° C. and the other quantities appearing in the expression for $\phi$ are expressed in the units referred to above.

Curves similar to those shown in FIGURES 1 and 2 may also be plotted for N-type bismuth telluride, and from them may be derived a curve showing the variation of the figure of merit $\phi$ with the electrical conductivity $\sigma$ for N-type bismuth telluride at a given temperature. Such curves are found to be very similar to those for P-type bismuth telluride, with minor numerical differences, and therefore need not be discussed in detail here. It may, however, be stated that the maximum value of the figure of merit $\phi$ for N-type bismuth telluride at a temperature of 290° K. is approximately 0.78, and that the maximum value of the overall figure of merit $\theta$ which may be obtained at a mean operating temperature of 290° K. with a thermocouple having elements respectively of P-type and N-type bismuth telluride is approximately 0.75, these two figures being calculated on the same basis as for that quoted for P-type bismuth telluride.

The properties of the semiconductors which are utilised in thermocouples according to the present invention will now be discussed; for convenience these semiconductors will be referred to in general as the specified semiconductors.

Firstly, as indicated above, the specified semiconductors have a crystal structure similar to that of bismuth telluride, and therefore display a similar anisotropy in respect of certain of their properties. As with bismuth telluride, for both conductivity types the value of the figure of merit $\phi$ is at a maximum for directions perpendicular to the principal crystal axis; further discussion of the properties of the specified semiconductors will therefore be restricted, as was the case for bismuth telluride, to the properties measured in such a direction. It will be appreciated that in view of this anisotropy the or each crystal in a thermocouple element of one of the specified semiconductors should be orientated with its principal crystal axis substantially perpendicular to the direction of the length of the element between the junctions of the thermocouple.

From measurements of the thermoelectric power $\eta$, the electrical conductivity $\sigma$ and the thermal conductivity $\lambda$ made on samples of the specified semiconductors, curves of the types shown in FIGURES 1 and 2 may be derived for each composition (separate curves of course being necessary for P-type and N-type material). Comparisons of such curves with the corresponding ones for bismuth telluride lead to the following observations in respect of the results obtained at temperatures above 250° K.

For each of the specified semiconductors, the curve of thermal conductivity $\lambda$ against the product of the electrical conductivity $\sigma$ and the absolute temperature T, for a given conductivity type and temperature, is substantially identical to the corresponding curve for bismuth telluride of the same conductivity type and at the same temperature, except for a downward shift of the whole curve parallel to the $\lambda$ axis corresponding to a lower value of the lattice component $\lambda_L$ of the thermal conductivtiy than for bismuth telluride. The value of the lattice component $\lambda_L$ depends upon the composition of the semiconductor, and the manner in which the value of the lattice component $\lambda_L$ varies with the composition is illustrated for the bismuth-antimony tellurides (that is those of the specified semiconductors containing no selenium or sulphur) and the bismuth seleno-tellurides (that is those of the specified semiconductors containing no antimony or sulphur) by the curves respectively shown in FIGURES 3 and 4 of the accompanying drawings, in which the lattice component $\lambda_L$ of the thermal conductivity, expressed in watts/centimetre ° C., is plotted against the molecular percentage of antimony telluride or bismuth selenide in the composition, for a temperature of 290° K. Generally similar results are obtained for the bismuth sulpho-tellurides (that is those of the specified semiconductors containing no antimony or selenium). The effect of substituting selenium and/or sulphur for part of the tellurium in one of the bismuth-antimony tellurides is to lower further the value of the lattice component $\lambda_L$, but not by such a large amount as is the case for the substitution of the same amount of selenium and/or sulphur for part of the tellurium in bismuth telluride itself.

For each of the specified semiconductors the curve of thermoelectric power $\eta$ against electrical conductivity $\sigma$, for a given conductivity type and temperature, is of a similar form to the corresponding curve for bismuth telluride of the same conductivity type and at the same temperature, but for some compositions displays an upward or downward shift compared with the curve for bismuth telluride, at least over some range of values of the electrical conductivity $\sigma$. Thus, for the bismuth-antimony tellurides containing less than 50% antimony telluride the curve is substantially identical to that for bismuth telluride; for the bismuth-antimony tellurides containing more than 50% antimony telluride the curve displays, for the higher values of the electrical conductivity $\sigma$, an upward shift compared with the curve for bismuth telluride; and for those of the specified semiconductors containing an appreciable amount of selenium and/or sulphur the curve displays, at least for the higher values of the electrical conductivity $\sigma$, a downward shift compared with the curve for bismuth telluride.

From the foregoing it will be seen that if a sample of any one of the specified semiconductors is compared with a sample of bismuth telluride, the two samples being of the same conductivity type and having the same electrical conductivity $\sigma$ at a given temperature T higher than 250° K., the two samples will have the same electronic component $\lambda_E$ of the thermal conductivity at the temperature T, but the sample of the specified semiconductor will have at the temperature T a lower lattice component $\lambda_L$ of the thermal conductivity than the sample of bismuth telluride, and consequently a lower overall value for the thermal conductivity $\lambda$. Further it may be stated that the two samples will have at the temperature T values of the thermoelectric power $\eta$ of the same order of magnitude, and that, although in some cases the thermoelectric power $\eta$ will be somewhat lower for the sample of the specified semiconductor than for the sample of bismuth telluride, in no case will the difference in this respect be so great as to counteract completely the advantage of the lower value of the thermal conductivity $\lambda$. Consequently, in every case the sample of the specified semiconductor will have a higher value of the figure of merit $\phi$ at the temperature T than will the sample of bismuth telluride, and it may therefore be concluded that all the specified semiconductors are superior to bismuth telluride for use as thermocouple materials.

The degree of superiority obtained in this respect will of course depend upon the composition of the specified semiconductor. In this connection, a particularly useful range of compositions is that in which the constitutional formula $Bi_mSb_nTe_pSe_qS_r$ is such that $n$ has a value in the range 0.35–1.6 and $3q+5r$ has a value in the range 0–0.9. For each composition in this range there exists, for both conductivity types, a relatively wide range of values of the electrical conductivity $\sigma$ at any given temperature over which the value of the figure of merit $\phi$ is not appreciably less than the maximum value of the figure of merit $\phi$ which may be obtained with bismuth telluride of the same conductivity type at the same temperature. In particular this is true for all the compositions in the relevant range for values of the electrical conductivity $\sigma$ in the range 500–2000 (ohm centimetres)$^{-1}$ at a temperature of 290° K.

The semiconductors utilised in thermocouples in accordance with the present invention may be prepared in the following manner. Bismuth, tellurium, and at least one of the elements antimony, selenium and sulphur are placed together in a cylindrical silica bomb having a length of about 17.5 centimetres and a diameter of 2.5 centimetres. The total weight of the constituents is made about 300 grams, the relative proportons of the elements corresponding to the desired composition of the semiconductor. The bomb is evacuated to produce inside it a vacuum corresponding to a pressure of less than $10^{-5}$ millimetres of mercury, and is then sealed.

The sealed bomb is then heated in a furnace at a temperature of 900° C. for at least three hours, in order to bring about complete formation of the semiconductor. After cooling to room temperature and removal from the bomb, the charge is loaded into a silica boat having dimensions of approximately 15 centimetres by 2.5 centimetres by 1.8 centimetres. The charge is then just melted by high frequency induction heating under an inert atmosphere so that it takes up the shape of the boat, and is then immediately cooled to room temperature to form a solid ingot.

The solidified ingot in the boat is then subjected to the process known as "reverse pass zone melting," in which a molten zone is formed at one end of the ingot and is caused to traverse the whole length of the ingot, first in one direction and then in the opposite direction; the process is carried out under a slow flow of inert gas at atmospheric pressure, and the rate of advance of the molten zone along the ingot may conveniently be of the order of 2.5 centimetres per hour.

The resultant ingot is found to consist of one or more crystals for each of which the principal crystal axis is disposed perpendicular to the longitudinal axis of the ingot; it should be noted that in the case of a polycrystalline ingot the principal crystal axes of the various crystals are not necessarily parallel to each other. It will be appreciated that if elements for thermocouples according to the invention are cut from such an ingot they will be cut in such a manner that the directions of their lengths are parallel to the longitudinal axis of the ingot.

Ingots prepared by the above method are found to be uniformly P-type; the electrical conductivity of the ingots increases with increase of the antimony content, and decreases with increase of the selenium or sulphur content, of the semiconductor.

In view of this fact, it will be apparent that in order to obtain N-type material it is necessary to introduce some donor impurity into the semiconductor; further, in many cases it will be desirable to introduce some donor impurity even where P-type material is required, in order that the electrical conductivity of the resultant material should have a value closer to the optimum value for use of the material in producing thermocouple elements than would be the case if no such impurity were introduced. Suitable impurities for this purpose are iodine, bromine, chlorine, tellurium and lithium. In some cases it may be desirable to introduce an acceptor impurity; for this purpose the elements lead, cadmium and bismuth are suitable. Where any of these elements except the halogens is used, the semiconductor is prepared by the method described above, the impurity element being added in the desired proportion to the constituent elements of the semiconductor in the starting material. Where one of the halogens is used, however, a slightly modified method of preparation is preferred, because of the volatility of these elements.

One example of the use of iodine in this modified method will now be described, with reference to a method of producing N-type bismuth-antimony telluride having the constitutional formula $Bi_{1.59}Sb_{0.41}Te_3$. In this method, bismuth, antimony, tellurium and iodine are placed together in a cylindrical silica bomb having a length of about 17.5 centimetres and a diameter of 2.5 centimetres. The total weight of the constituents is made about 300 grams, of which the iodine constitutes about 0.18%, the relative proportions of the bismuth, antimony and tellurium corresponding to bismuth-antimony telluride of the specified composition. The bomb is evacuated to produce inside it a vacuum corresponding to a pressure of less than $10^{-5}$ millimetres of mercury, and is then sealed; the evacuation period is standardised at 15 minutes, in order to make consistent allowance for the volatilisation of iodine which occurs.

The sealed bomb is then heated in a furnace at a temperature of 900° C. for at least three hours, in order to bring about complete formation of the bismuth-antimony telluride and uniform distribution of the iodine. After cooling to room temperature and removal from the bomb, the charge is loaded into a silica boat having dimensions of approximately 15 centimetres by 2.5 centimetres by 1.8 centimetres. The charge is then just melted by high frequency induction heating under an inert atmosphere so that it takes up the shape of the boat, and is then immediately cooled to room temperature to form a solid ingot.

The solidified ingot in the boat is then subjected to the process known as "single pass zone melting," in which a molten zone is formed at one end of the ingot and is caused to traverse the whole length of the ingot; the process is carried out under a slow flow of inert gas at atmospheric pressure, and the rate of advance of the molten zone along the ingot may conveniently be of the order of 2.5 centimetres per hour.

In the case of this method also, the resultant ingot is found to consist of one or more crystals for each of which the principal crystal axis is disposed perpendicular to the longitudinal axis of the ingot; the same remarks therefore apply in this case as are made above concerning the orientation of elements for thermocouples cut from such an ingot.

An ingot prepared by the method just described was found to be uniformly N-type, having at a temperature of 290° K. a thermoelectric power of about −195 microvolts/° C. and an electrical conductivity (measured along the length of the ingot) of about 1000 (ohm centimetres)$^{-1}$.

By way of illustration, details are given in Tables I and II below for a number of examples of the semiconductors which may be used in thermocouples according to the present invention. For each of the examples an ingot was prepared by the appropriate one of the methods described above, and details of the composition in each case are given in Table I; in this table there are indicated for each case the values of the coefficients $n$, $q$ and $r$ in the constitutional formula $Bi_mSb_nTe_pSe_qS_r$, together with an indication of the nature and amount of any impurity added to the constituent elements of the semiconductor in the starting material, the amount of the impurity being expressed as a ratio of the weight of the impurity to the total weight of the constituent elements of the semiconductor. For each of the examples measurements were made at a temperature of 290° K. on samples cut from the relevant ingot, the measurements being made in the direction corresponding to the longitudinal axis of the ingot. The results of these measurements are given in Table II, in which for each case there are indicated the values of the thermoelectric power $\eta$ (positive for P-type material and negative for N-type material), expressed in microvolts/° C., the electrical conductivity $\sigma$, expressed in (ohm centimetres)$^{-1}$, the thermal conductivity $\lambda$, expressed in watts/centimetre ° C., the figure of merit $\phi$, calculated on the basis referred to above in connection with bismuth telluride, and the corresponding value of the figure of merit $\phi$ for bismuth telluride of the same conductivity type and electrical conductivity.

Table I

| Example | n | q | r | Impurity |
|---|---|---|---|---|
| 1 | 0.23 | | | |
| 2 | 0.41 | | | |
| 3 | 0.41 | | | 0.18% Iodine. |
| 4 | 0.90 | | | |
| 5 | 0.90 | | | 0.12% Iodine. |
| 6 | | 0.33 | | |
| 7 | | 0.33 | | 0.06% Lead. |
| 8 | | | 0.13 | 0.075% Lead. |
| 9 | | | 0.22 | 0.06% Iodine. |
| 10 | 0.38 | 0.16 | | 0.1% Iodine. |
| 11 | 0.82 | 0.27 | | |
| 12 | 1.48 | 0.05 | | 4% Tellurium. |
| 13 | 1.58 | 0.21 | | 5% Tellurium. |
| 14 | 0.86 | | 0.10 | |
| 15 | 0.83 | 0.15 | 0.10 | |

Table II

| Example | $\eta$ | $\sigma$ | $\gamma$ | $\phi$ | $\phi(Bi_2Te_3)$ |
|---|---|---|---|---|---|
| 1 | +217 | 720 | 0.0171 | 0.76 | 0.73 |
| 2 | +176 | 1,230 | 0.0165 | 0.82 | 0.71 |
| 3 | −196 | 1,030 | 0.0155 | 0.86 | 0.78 |
| 4 | +147 | 1,740 | 0.0169 | 0.80 | 0.63 |
| 5 | +202 | 810 | 0.0134 | 0.85 | 0.73 |
| 6 | +273 | 305 | 0.0129 | 0.72 | 0.52 |
| 7 | +204 | 740 | 0.0139 | 0.80 | 0.73 |
| 8 | +205 | 740 | 0.0140 | 0.80 | 0.73 |
| 9 | −223 | 545 | 0.0122 | 0.82 | 0.72 |
| 10 | −226 | 590 | 0.0123 | 0.84 | 0.72 |
| 11 | +181 | 860 | 0.0125 | 0.81 | 0.73 |
| 12 | +185 | 1,400 | 0.0158 | 0.94 | 0.68 |
| 13 | +156 | 1,430 | 0.0164 | 0.79 | 0.68 |
| 14 | +169 | 1,100 | 0.0133 | 0.83 | 0.73 |
| 15 | +191 | 625 | 0.0113 | 0.77 | 0.72 |

Figure 5:
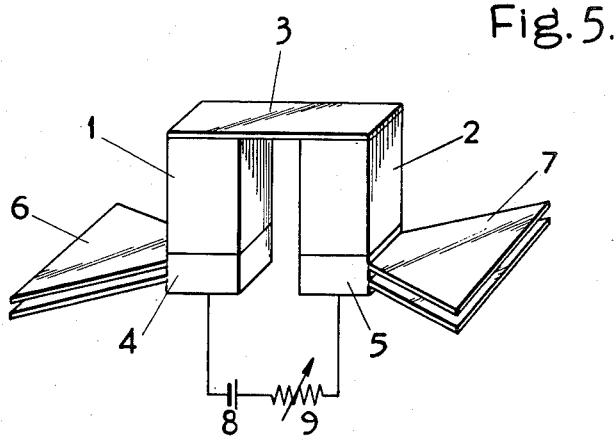
FIGURE 5 is a diagrammatic perspective view of a thermocouple.

One thermocouple in accordance with the present invention will now be described by way of example with reference to FIGURE 5 of the accompanying drawings, which is a diagrammatic perspective view of the thermocouple. The thermocouple includes a P-type element 1 and an N-type element 2, respectively having compositions corresponding to the Examples 12 and 13 quoted in Table I. The elements 1 and 2 both have a length of one centimetre and a cross secion 0.5 centimetre square, and are respectively cut from ingots prepared by the first and second methods described above so that their longitudinal axes are parallel to the longitudinal axes of the respective ingots. Corresponding ends of the elements 1 and 2 are electrically connected together by means of a copper strip 3 soldered to the elements 1 and 2, the strip 3 effectively constituting the cold junction of the thermocouple. The other ends of the elements 1 and 2 are respectively soldered to copper blocks 4 and 5 which effectively constitute the hot junction of the thermocouple and are respectively provided with cooling fins 6 and 7. The end faces of the elements 1 and 2 are plated with nickel prior to the relevant soldering operations.

The thermocouple is adapted for refrigeration of an object placed in contact with the strip 3, for example an element of a dew point hygrometer, and in operation a battery 8 and a variable resister 9 are connected in series between the copper blocks 4 and 5, the battery 8 being poled as shown in the drawing and the resistor 9 being utilised to vary the current through the thermocouple and thereby the temperature of the strip 3.

For a mean operating temperature of 290° K., the overall figure of merit $\theta$ for the thermocouple just described is approximately 0.90, calculated on the same basis as referred to above for bismuth telluride; for this figure of merit the maximum temperature difference between the hot and cold junctions of the thermocouple which may be achieved at a mean operating temperature of 290° K. is approximately 86° C.

We claim:

1. A thermocouple in which at least one element consists essentially of a semiconductor having a constitutional formula $Bi_mSb_nTe_pSe_qS_r$ (where $n$ has a value in the range 0–1.8, $q$ has a value in the range 0–0.4 and $r$ has a value in the range 0–0.24, subject to the conditions that $m+n=2$, $p+q+r=3$, $3n+2q+2r$ is not less than 0.03, and $3q+5r$ is not greater than 1.2), the semiconductor having a crystal structure similar to that of bismuth telluride and each crystal of the semiconductor in the element being orientated with its principal crystal axis substantially perpendicular to the direction of the length of the element between the junctions of the thermocouple.

2. A thermocouple according to claim 1, in which the constitutional formula of the semiconductor is such that both $q$ and $r$ are zero.

3. A thermocouple according to claim 1, in which the constitutional formula of the semiconductor is such that $n$ has a value in the range 0.35–1.6 and $3q+5r$ has a value in the range 0–0.9, and the semiconductor has an electrical conductivity, measured in the direction of the length of the element at a temperature of 290° K., lying in the range 500–2000 (ohm centimetres)$^{-1}$.

4. A thermocouple according to claim 1, in which the semiconductor contains at least one of the elements iodine, bromine, chlorine, tellurium and lithium as a donor impurity.

5. A thermocouple according to claim 1, in which the semiconductor contains at least one of the elements lead, cadmium and bismuth as an acceptor impurity.

6. A thermocouple according to claim 1, in which the semiconductor is of P-type conductivity.

7. A thermocouple having two elements which are as specified in claim 1, one being of P-type conductivity and the other being of N-type conductivity.

8. A thermocouple as set forth in claim 7 in which the element of P-type conductivity has a value of $n$ equal to 1.48, a value of $q$ equal to 0.05, a value of $r$ equal to 0 and 4% tellurium as an impurity and wherein the element of N-type conductivity has a value of $n$ equal to 0.41, $q$ equal to 0, $r$ equal to 0 and 0.18% iodine as an impurity.

References Cited in the file of this patent

UNITED STATES PATENTS

| | | |
|---|---|---|
| 2,685,608 | Justi | Aug. 3, 1954 |
| 2,739,088 | Pfonn | Mar. 20, 1956 |
| 2,754,259 | Robinson et al. | July 10, 1956 |
| 2,762,730 | Alexander | Sept. 11, 1956 |
| 2,762,857 | Lindenblad | Sept. 11, 1956 |
| 2,788,382 | Faus | Apr. 9, 1957 |
| 2,811,569 | Fredrick et al. | Oct. 29, 1957 |
| 2,886,618 | Goldsmid | May 12, 1959 |

OTHER REFERENCES

Telkes "J. App. Phys.," vol. 18, pp. 1116–1127, December 1947.